UNITED STATES PATENT OFFICE.

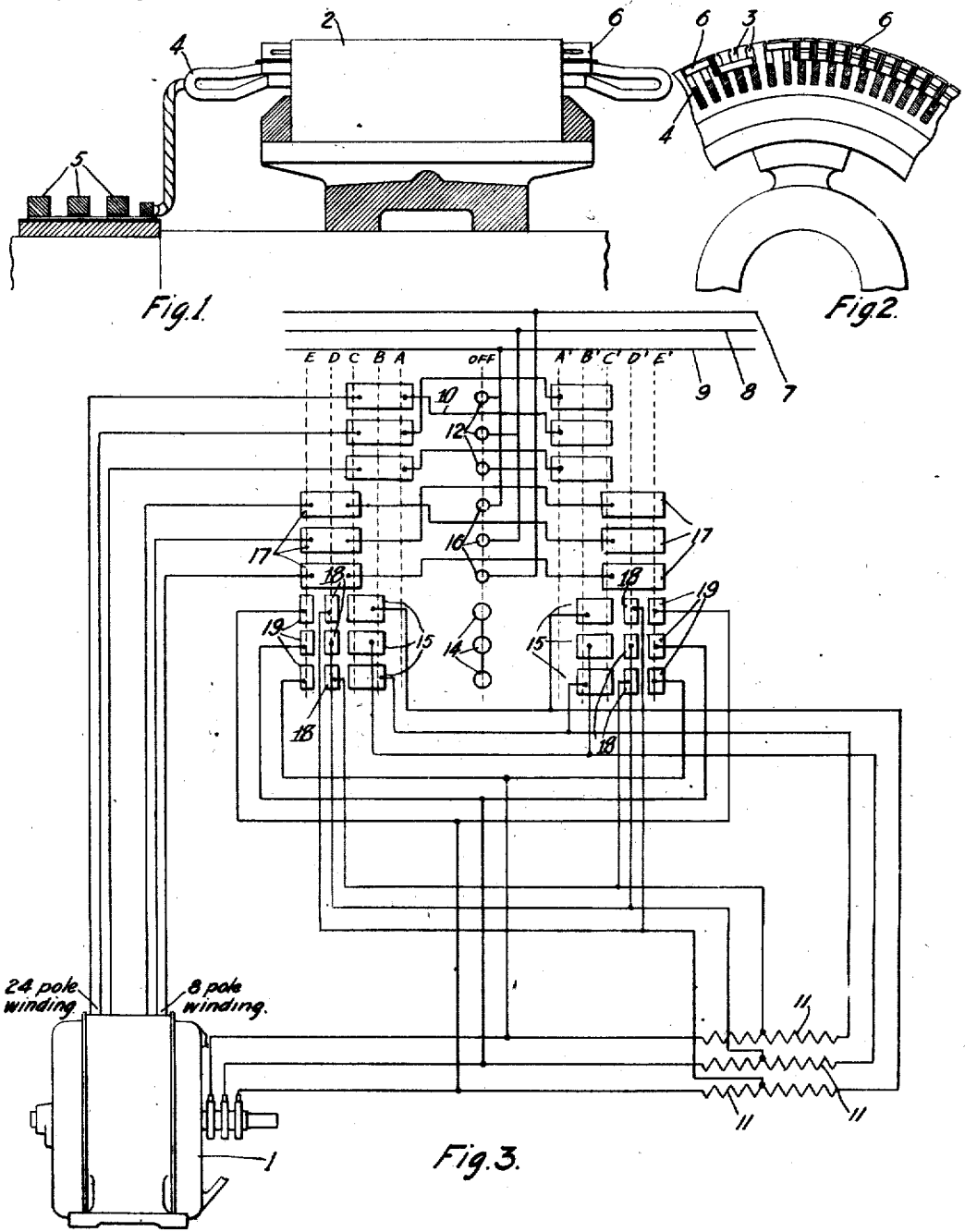

GEORGE J. SCHMIDT, OF WILKINSBURG, PENNSYLVANIA, ASSIGNOR TO WESTINGHOUSE ELECTRIC AND MANUFACTURING COMPANY, A CORPORATION OF PENNSYLVANIA.

INDUCTION-MOTOR.

1,264,444.  Specification of Letters Patent.  Patented Apr. 30, 1918.

Application filed December 4, 1914. Serial No. 875,447.

*To all whom it may concern:*

Be it known that I, GEORGE J. SCHMIDT, a citizen of the United States, and a resident of Wilkinsburg, in the county of Allegheny and State of Pennsylvania, have invented a new and useful Improvement in Induction-Motors, of which the following is a specification.

My invention relates to induction motors, and it has particular reference to such motors as are provided with a plurality of primary windings for producing a corresponding number of sets of poles.

My invention has for one of its objects to provide a novel method of controlling motors of the above indicated character, whereby they may be operated efficiently at varying speeds.

A further object of my invention is to provide an induction motor which embodies a novel arrangement of the windings of the secondary member.

It has been proposed, heretofore, to so arrange induction motors as to adapt them for connection to produce different numbers of poles in order to obtain a plurality of operating speeds. This may be accomplished either by varying the connections of a single winding or by providing a plurality of windings of different pole numbers. In either arrangement, it has been the usual practice to break one connection before the other has been completed. The number of speeds in such a construction is limited, therefore, to the number of combinations of connections or to the number of windings, as the case may be.

My invention comprises an arrangement whereby the number of operating speeds may exceed the number of primary windings and the circuit of the motor is maintained during the change in connections from one winding to another. When more than one primary winding is in circuit at one time, a speed is produced that is intermediate the speeds corresponding to the several windings. In such a case, the winding for producing the smaller number of poles tends to bring the rotor to its synchronous speed but the winding having the larger number of poles retards the rotor when its speed exceeds the synchronous speed of the latter winding. The result is to provide an intermediate speed without the employment of an additional winding.

My invention further comprises a novel construction of the secondary member or rotor of the motor whereby it is provided with a distributed winding of the usual type and a squirrel-cage winding consisting of short-circuited loop coils that are superposed upon the coils of the other winding. Heretofore, rotors have usually been arranged with the squirrel cage winding in the bottoms of the rotor slots and the phase winding superposed upon it. This construction has been made necessary by the fact that the phase winding must be threaded in and must, consequently, be on top of the bar and not underneath because, in the latter case, the end ring would interfere with its insertion. The interference of the end ring with the insertion of the phase winding could be prevented by making the conductors unduly long, but this construction is not practical.

The arrangement in which the squirrel cage winding is placed in the bottom of the slots possesses several disadvantages. The squirrel cage winding has relatively the greater leakage, because it is principally active with the higher number of poles, and should therefore be placed where the leakage would be a minimum, that is, in the tops of the rotor slots nearest the air gap. In addition to this, the squirrel cage winding is of relatively high resistance in order to secure a high starting torque at a high power factor. As a result of this resistance, a comparatively great amount of heat is developed in a short period of time.

This heat must be rapidly dissipated and, in order to accomplish this result, the squirrel cage winding must be so disposed as to facilitate the radiation of heat from its surfaces. This cannot be accomplished efficiently if it is placed in the bottom of the rotor slots underneath the phase-wound rotor winding. This is best accomplished by placing the squirrel-cage or high-resistance winding in the tops of the rotor slots nearest the surface of the rotor. In addition, the insulation of the phase winding is often damaged by the excessive temperatures caused by inclosing the squirrel-cage winding in this manner.

The details of my invention will be described in connection with the accompanying drawings in which Figure 1 is a side view, in longitudinal section, of a portion of the secondary member of a motor constructed in accordance with my invention. Fig. 2 is an end view of the mechanism of Fig. 1. Fig. 3 is a diagrammatic view of circuits and apparatus embodying my invention.

A dynamo-electric machine 1 is provided with two primary windings, the details of which are not shown. The windings are respectively arranged to produce different numbers of poles, as, for example, eight poles and twenty-four poles, as indicated by the legends (Fig. 3).

Reference may now be had to Figs. 1 and 2, in which the construction of the secondary member or rotor 2 is shown in detail. The rotor 2, only a portion of which is shown, is provided with any suitable number of slots 3, as, for example, one hundred and eight. The bottoms of the slots are occupied by the coils of a phase winding 4 which is adapted to coact with the eight-pole primary winding. The terminals of the phase winding 4 are connected to slip rings 5. The arrangement of the winding 4 is not shown in detail because it is of the usual standard type and forms no part of the present invention.

A squirrel-cage winding consisting of short circuited loop coils 6 is superposed upon the phase winding 4. The coils of the squirrel-cage winding are formed by slotting a flat strap of brass, aluminum, copper or other suitable material and then expanding the same until the sides are separated by a sufficient distance to give the coils a suitable pitch or throw, as, for example, of four slots. Each conductor thus forms part of short-circuited turn or loop and all of these loops together form a substitute for the usual squirrel-cage type of winding. As employed in the present invention, several coils as, for example, three, are placed side by side in the same slots. This short-circuited winding is adapted to coact with the twenty-four-pole winding.

Referring now to Fig. 3, line conductors 7, 8 and 9, which may be connected to any suitable source of alternating current, supply power to the motor 1 through a controller 10. The resistance of the secondary circuit comprising the phase winding 4 is controlled by means of resistors 11 that may be inserted in circuit with the several phases. My invention is particularly adapted for use in connection with elevators, hoists and similar machines, and the controller 10 is accordingly arranged for operation in opposite directions for reversing the direction of rotation of the motor.

It may be assumed that the controller 10 is in its illustrated or "off" position. If, for example, it is moved to the left contact fingers 12 engage corresponding contact segments 13 to connect the twenty-four-pole or low-speed winding to the line conductors (position A). The motor then operates at a relatively low speed which may be, for example, approximately 240 R. P. M. During this arrangement of the connections, the winding 4 is not connected in circuit and is, therefore, entirely inactive because no current traverses it.

Further actuation of the controller 10 effects the engagement of contact fingers 14 with corresponding contact segments 15 and thereby connects the terminals of the winding 4 with the resistors 11 in circuit (position B). The controller operates, also, to subsequently effect the engagement of contact fingers 16 with corresponding contact segments 17 and thereby connect the eight-pole primary winding to the line conductors while maintaining the connection of the twenty-four-pole winding. (position C). The result is to change the speed from 240 to approximately 300 R. P. M. The two connections just described may be effected simultaneously, if desired, but are arranged in above sequence for safety.

In the next position of the controller, the twenty-four-pole winding is disconnected from the line conductors by the separation of the contact fingers 12 from the contact segments 13 (position D). The contact fingers 14 are now in engagement with contact segments 18 to remove portions of the resistors 11 from the secondary circuit. The speed corresponding to this position exceeds the above mentioned intermediate speed because of the decreased resistance of the secondary circuit and the opening of the twenty-four pole primary circuit.

In the final position of the controller, the contact fingers 14 engage contact segments 19, and the resistors 11 are entirely removed from the secondary circuit, and the winding 4 is short circuited (position E). The speed is now increased to appoximately 850 R. P. M. During the operation at high speed, the squirrel-cage winding is substantially inactive because of its high resistance compared with the low resistance of the phase winding and because the throw or pitch renders it relatively inefficient when used with the eight-pole primary winding. To stop the motor, the controller is brought to its central or inoperative position and the above operations occur in reverse order.

It has been found that, by inserting resistance in the secondary circuit in the manner above described, excessive rushes of current, while changing from one connection to another, are avoided. By maintaining the connection of one winding while another is being connected in circuit, an intermediate speed is produced which causes the car or other device actuated by the motor to be accelerated or retarded gradually without jar or jerk. The intermediate speeds may be varied as desired by changing the value of resistance in circuit with the secondary winding.

It will be obvious, also, that the speed may be increased in steps, as desired, from the intermediate speed to high speed by increasing the number of steps employed in cutting out the resistance of the secondary circuit. Another advantage of operating the motor in the manner above described is that the primary circuit is not opened during the change in connections, and rushes of current, upon the closing of the motor circuit, which sometimes result from conditions which approximate short-circuiting conditions, are entirely avoided.

Various modifications may occur to those skilled in the art to which my invention appertains and it is understood that such changes as fall within the scope of the appended claims may be made without departing from the spirit of my invention.

I claim as my invention:

1. The method of accelerating an induction motor comprising means for producing alternative primary pole sets of two different pole numbers and with secondary windings responsive to said primary pole sets, respectively, which comprises energizing the primary pole set of high pole number while permitting the energization of the corresponding secondary winding, whereby the motor starts, closing the circuit of the other secondary winding, energizing the primary pole set of low pole number and deënergizing the primary pole set of high pole number.

2. The method of accelerating an induction motor comprising means for producing alternative primary pole sets of two different pole numbers and with secondary windings responsive to said pole sets, respectively, the secondary winding corresponding to the low pole number being a phase winding provided with means for opening its circuit, which comprises energizing the primary pole set of high pole number and the corresponding secondary winding, closing the circuit of the low pole number secondary winding, energizing the primary pole set of low pole number and deënergizing the primary winding of high pole number.

3. The method of accelerating an induction motor comprising means for producing alternative primary pole sets of two different pole numbers, with a squirrel-cage secondary winding most actively responsive to a primary field of the high pole number and a secondary phase winding responsive to a primary field of the low pole number, said phase-winding being provided with means for closing its circuit through an adjustable resistor, which comprises energizing the primary pole set of high pole number, whereby said squirrel cage secondary winding is energized and the motor starts, closing the circuit of said secondary phase-winding through a relatively high resistance, energizing the primary pole set of low pole number and deënergizing the primary pole set of high pole number while reducing the resistance in circuit with said secondary phase-winding.

4. The method of decelerating an induction motor comprising means for producing alternative primary pole sets of two different pole numbers and with secondary windings responsive to said primary pole sets, respectively, said motor operating with the primary pole set of low pole number and the corresponding secondary winding, which comprises energizing the primary pole set of high pole number, deënergizing the primary pole set of low pole number and disconnecting the secondary winding of low pole number.

5. The method of decelerating an induction motor comprising means for producing alternative primary pole sets of two different pole numbers and with secondary windings responsive to said pole sets, respectively, the secondary winding corresponding to the low pole number being a phase winding provided with means for opening its circuit, said motor operating with the primary pole set of low pole number and the corresponding secondary winding, which comprises energizing the primary pole set of high pole number, deënergizing the primary pole set of low pole number and disconnecting the secondary winding of low pole number.

6. The method of decelerating an induction motor comprising means for producing alternative primary pole sets of two different pole numbers, with a squirrel-cage secondary winding most actively responsive to a primary field of the high pole number and a secondary phase-winding responsive to a primary field of the low pole number, said phase winding being provided with means for closing its circuit through an adjustable resistor, said motor operating with said primary pole set of low pole number and with the corresponding secondary circuit of low resistance, which comprises increasing the resistance of said secondary circuit, introducing the primary pole set of high pole number into circuit, eliminating the primary pole set of low number and opening the circuit of the secondary circuit of low pole number.

In testimony whereof, I have hereunto subscribed my name this 27th day of Nov., 1914.

GEORGE J. SCHMIDT.

Witnesses:
O. C. SCHOENFELD
B. B. HINES.